United States Patent
Gschwind

(10) Patent No.: US 7,912,360 B2
(45) Date of Patent: Mar. 22, 2011

(54) TANK SYSTEM WITH A MAIN TANK AND A MELTING DEVICE HAVING A MELT TANK

(75) Inventor: Thomas Gschwind, Bad Durkheim (DE)

(73) Assignee: DBK David + Baader GmbH, Kandel/Pfalz (DE)

(*) Notice: Subject to any disclaimer, the term of this patent is extended or adjusted under 35 U.S.C. 154(b) by 1154 days.

(21) Appl. No.: 11/528,478

(22) Filed: Sep. 26, 2006

(65) Prior Publication Data

US 2007/0157602 A1 Jul. 12, 2007

(30) Foreign Application Priority Data

Sep. 26, 2005 (DE) .......................... 10 2005 046 029
Jul. 7, 2006 (DE) .......................... 20 2006 010 615

(51) Int. Cl.
*F24H 1/20* (2006.01)

(52) U.S. Cl. .................. 392/456; 392/302; 392/449

(58) Field of Classification Search ............... 392/302, 392/456

See application file for complete search history.

(56) References Cited

U.S. PATENT DOCUMENTS

| | | | | |
|---|---|---|---|---|
| 3,292,866 A | * | 12/1966 | Benner | 239/284.1 |
| 4,090,668 A | * | 5/1978 | Kochenour | 239/130 |
| 5,509,606 A | * | 4/1996 | Breithaupt et al. | 239/130 |
| 6,133,546 A | * | 10/2000 | Bains | 219/202 |
| 6,399,554 B1 | * | 6/2002 | Harrington et al. | 510/200 |
| 2002/0088220 A1 | | 7/2002 | Weigl | 60/286 |
| 2005/0177969 A1 | | 8/2005 | Franco et al. | 15/250.01 |
| 2006/0162112 A1 | * | 7/2006 | Pomeroy et al. | 15/250.04 |
| 2008/0283629 A1 | * | 11/2008 | Shank et al. | 239/284.1 |
| 2009/0014035 A1 | * | 1/2009 | Franco et al. | 134/19 |
| 2009/0145592 A1 | * | 6/2009 | Leitch et al. | 165/185 |
| 2009/0277444 A1 | * | 11/2009 | Lin | 126/643 |
| 2010/0133356 A1 | * | 6/2010 | Shank et al. | 239/284.1 |

FOREIGN PATENT DOCUMENTS

DE 195 08 598 A1 9/1996
DE 203 15 852 U1 1/2004

* cited by examiner

*Primary Examiner* — Thor S Campbell
(74) *Attorney, Agent, or Firm* — Seed Intellectual Property Law Group PLLC

(57) ABSTRACT

A tank system can provide a predetermined cold start volume ($V_{KS}$) of an operating liquid required by a liquid consumer after a cold start. The tank system can provide a urea solution to an SCR catalytic converter. The tank system includes a main tank with a filling opening through which the interior of the main tank can be filled with operating liquid. To melt a predetermined volume of the frozen liquid in a fast, efficient and complete manner, a melting device is provided. The melting device includes a melt tank which encloses a melting space and which comprises an inlet opening through which the melting space can be filled with the operating liquid from the interior of the main tank. The melting device includes a cold start heater for melting frozen liquid in the melting space. The melting space is at least as large as the cold start volume ($V_{KS}$) and is smaller than the interior of the main tank.

35 Claims, 8 Drawing Sheets

TANK SYSTEM WITH A MAIN TANK AND A MELTING DEVICE HAVING A MELT TANK

BACKGROUND OF THE INVENTION

1. Technical Field of the Invention

The present invention in some embodiments refers to a tank system for providing an ice-free cold start volume of an operating liquid required by a liquid consumer after a cold start. A SCR (selective catalytic reduction) catalytic converter comprises a main tank having a filling opening, through which the interior of the main tank can be filled with operating liquid, such as a urea solution. The invention in some embodiments further refers to a kit for such tank systems.

2. Description of the Related Art

In fluid systems, which convey a liquid from a reservoir through lines to a liquid consumer, the problem occurs that the liquids freeze in the tanks if the ambient temperature drops below the freezing point of the liquid to be conveyed. During the winter, for example, the cleaning solution of the windscreen washer system freezes in the tank so that the rear window and the windshield cannot be cleaned immediately after the cold start.

For this reason, the cleaning liquids of windscreen and headlamp washing systems in motor vehicles are supplied with an antifreeze. However, the antifreeze only lowers the freezing point of the windscreen wiping water to approx. −20° C. to −17° C. so that the liquid freezes in the tank and in the tubes of the windscreen wiping system at temperatures below −20° C. despite the antifreeze.

To lower the nitrogen oxide emissions in the exhaust gases of internal combustion engines, e.g. of diesel engines, an exhaust gas purification according to the so-called SCR method may be carried out. In the SCR method, the nitrogen oxides are chemically converted in a catalytic converter with a suitable reduction agent to the harmless substances, such as nitrogen and water. As a reduction agent, vaporous or gaseous ammonium is used, which is generated from an aqueous urea solution and which is introduced into the exhaust gas flow.

Under the trade name AdBlue® an aqueous urea solution with a urea content of 32.5 percent by weight for reducing the nitrogen oxide emission in motor vehicles is offered. Using AdBlue® the problem exists that this liquid freezes below −11° C. in the tank of the SCR system and can no longer be conveyed to the catalytic converter.

Thus, it is required to equip the vehicle tanks of SCR systems or windscreen or headlamp cleaning systems with heating systems, which melt the frozen liquid in the tank, i.e., transform it to a liquid state capable of flowing to the consumer.

Systems are known from the prior art, in which liquid tanks in motor vehicles are externally coated by heating sheets or heating mats to melt the liquid frozen in the tank. Other heating systems are for example shown in DE 203 15 852 U, DE 195 08 598 A, US 2002/088220 A1 and US 2005/177696 A1.

However, heating sheets or heating mats applied to the outside of the tank wall have a very poor efficiency, since a major part of the heat generated is not conducted into the tank to melt the frozen liquid but gets lost to the environment of the tank.

The development of tank heating systems aims at accommodating heating coils within the tank to avoid the loss of heat occurring with the heating mats. However, the use of heating coils within the tank is disadvantageous since the heat of the heating coils is only distributed to a relatively small volume. Since the melting by means of heating coils takes place mostly in the direct proximity of the heating surface, layers of air are formed around the radiator when the water runs off. These air cushions have the disadvantage that they have a thermally insulating effect, and thus the efficiency of the heating coils drops drastically.

Additionally, the capacity and the temperature of the heating elements may not be arbitrarily high. If the heating temperature exceeds the boiling point of either the substance to be melted or of the component of the liquid with the lowest boiling point (e.g., the alcohol of the windscreen cleaning liquid), evaporation occurs in the proximity of the heating surfaces. Air bubbles are generated during this evaporation, which also reduces the heat conduction and the efficiency of the melting procedure. During melting of aqueous urea solutions, temperatures of above 60° C. lead to a thermal decay of the urea so that this maximum temperature at the exothermic surfaces must not be exceeded.

BRIEF SUMMARY OF THE INVENTION

The object of the present invention in some embodiments is to provide a tank system for motor vehicles. The tank system can employ a urea solution for an SCR catalytic converter. Even if the ambient temperatures are below the freezing point of the operating liquid, a substantially ice-free operating liquid can be conveyed from the tank system to the liquid consumer after cold start of a facility or a motor vehicle.

In some embodiments, the tank system includes a melting device comprising a melt tank, which encloses a melting space and which comprises an inlet opening through which the melting space can be filled from the interior of the tank with operating liquid as well as a discharge opening, and which melting device comprises a cold start heating for melting of operating liquid frozen in the melting space, wherein the melt space is at least as large as the cold start volume and smaller than the interior of the tank.

This surprisingly simple solution has the advantage that after a cold start, a part of the tank system, namely the melting space, must be melted, which part must be available to the liquid consumer during initiation and a starting period after the cold start. The melting space forms a volume spatially separated from the interior of the main tank by the melt tank. The melting space is small with respect to the interior of the tank or the overall volume of the tank system so that a fast melting is possible. Since the melt tank comprises the discharge opening of the tank system, the liquid consumer may be supplied with a sufficient quantity of operating liquid after the cold start independent of the main tank. The melting of operating liquid frozen in the main tank is therefore not required for the initiation of the liquid consumer, but may rather be carried out as long as liquid from the melt tank is available.

A plurality of tank systems can be independent of one another and may be connected with one another in any manner. Some individual embodiments and the advantages in connection to these embodiments will now briefly be discussed.

In an especially space-saving compact design of the tank system, the melting device may be arranged in the interior of the main tank. This embodiment has the advantage that the heat generated by the cold start heating is conducted via the melt tank into the interior of the main tank, thereby indirectly heating the main tank.

An especially simple maintenance and a good accessibility of the melting device can be achieved in that the melting device is arranged on the outside of the main tank.

The melt tank may be arranged at any location on or in the main tank. The melt tank may be arranged on the bottom or tank jacket of the main tank. An arrangement of the melt tank on the bottom has the advantage that the melting space with respect to the direction of gravity lies on the deepest point of the tank system. Even in the case of relatively low liquid levels in the interior of the main tank, operating liquid always flows from the interior of the main tank through the inlet opening of the melt tank into the melting space, if liquid is removed from this melting space, and provided that the operating liquid in the interior of the main tank is capable to flow.

In some embodiments, the melt tank is directly underneath the bottom of main tank. By this arrangement, the operating liquid may substantially completely be transferred from the interior of the main tank into the melting space of the melt tank.

The arrangement of the melt tank on the tank jacket of the main tank offers the advantage of an improved accessibility of the mounted tank system, since the main tank does not cover the melt tank of the melting device.

If melted operating liquid is conveyed from the melting space of the melting device to the liquid consumer without liquid succeeding through the inlet opening from the interior of the main tank, e.g. because the liquid is still frozen in the interior of the tank, a vacuum is formed in the melt tank. To avoid the generation of a vacuum, the melt tank may have a venting valve in a further embodiment.

A melt tank arranged at the tank jacket and in the interior of the main tank may be ventilated directly through the ventilation of the main tank, if the inlet opening of the melt tank lies above the operating liquid level in the interior of the main tank. This avoids the generation of a vacuum within the melt tank in a simple manner.

In a further embodiment, the main tank may have a further discharge opening of the tank system. This may be particularly advantageous if the melt tank of the melting device does not have its own ventilation valve and the inlet opening is arranged above the liquid level in the interior of the main tank. In this case operating liquid is conveyed out of the melt tank to the liquid consumer as long as the interior of the main tank is still frosted. As soon as the operating liquid in the interior of the main tank is melted, the removal from the melt tank is stopped to take liquid instead via the further discharge opening directly from the main tank.

Concerning production, the main tank and the melt tank of the melting device may both form an integral part or may be separate components of a modular tank system.

An integral tank system with a melt tank and a main tank enables a single-stage manufacture of the tank, e.g. by means of a blow molding method. This embodiment is particularly advantageous if the melting device is arranged in the main tank.

A kit-like tank system comprising a main tank, a melt tank and possibly a cold start heating as separate components or modules of the tank system has advantages with respect to maintenance and variability.

In a further embodiment, the melting device may be arranged in a manner spatially separated from the main tank, wherein the interior of the main tank is connected to the inlet opening of the melt tank via a connection line. In this embodiment, the mounting position of the melting device in the system or the motor vehicle is independent of the mounting position of the main tank that is larger compared to the melt tank. In this manner the melting device may be arranged either close to the liquid consumer to keep the way from the discharge opening to the liquid consumer as small as possible. Furthermore, the melt tank of the melting device may also be placed within the engine space to possibly utilize the heat of the motor for melting frozen operating liquid. In this manner, the cold start heater may be designed as a tubular heating operated by engine coolant or exhaust gas from the engine.

In order to facilitate filling of the melt tank and to reduce pressure loss along the flow-out direction of the operating liquid out of the interior of the main tank through the inlet opening into the melting space of the melt tank and through the discharge opening out of the melt tank, the melt tank may be formed as a container open on one side. The open container side in this embodiment is the inlet opening of the melt tank, which is connected to the interior of the main tank in a fluid-conducting manner. The melt tank is preferably arranged such that the inlet opening or the open tank side are aligned substantially perpendicular with respect to the direction of gravity.

To reduce the installation work, the cold start heater may be arranged on or in the wall of the melt tank according to some embodiments. To minimize the loss of heat, the cold start heating may be arranged within the melting space so that the heat generated by the cold start heater is directly conducted into the frozen operating liquid. In order to achieve that an operative cold start heater is available before or at least at the same time of the cold start of the system or the motor vehicle, the cold start heating may comprise an electric heating element. Besides all electric heating devices, other heating devices, such as cooling water coils or fuel operated heating systems may be used.

In order to uniformly heat and quickly melt down a predetermined volume of a frozen liquid despite a limited heating capacity of the cold start heating within a short period of time after the cold start of a facility or a motor vehicle, some embodiments may comprise a cold start heater for melting the liquid in fuel tanks for a liquid consumer, such as an SCR catalytic converter or a windscreen or headlamp cleaning system. The fuel tank comprises at least one heating element generating heat during operation with a predetermined limited, maximal heating capacity and comprising at least one heat distribution element, which thermally communicates with the heating element in a heat-conductive manner and which comprises defrosting surfaces projecting into the tank and extending away from the heating element, through which the defrosting surfaces heat can directly be transferred during operation into the liquid frozen in the tank, wherein the defrosting surfaces span a melt liquid volume, whose volume at least corresponds to a cold start volume of melted down liquid, which may be available to the liquid consumer within a defined cold start period.

This embodiment has the advantage that the required cold start volume of melted down liquid is quickly and uniformly heated and melted by the arrangement and distribution of the defrosting surfaces in the melting liquid volume. Some embodiments provide a highly efficient cold start heater, which enables that despite a limited heating efficiency at least the initial operating volume is available, which must be available during initiation of the liquid consumer within a predetermined period of time after the cold start.

The application of the disclosed embodiments is, however, not only restricted to the cold start process. An application of the heating means according to some embodiments is also possible in the case of icing of the liquid in the tank also during operation, e.g. if the ambient temperature drops for climatic or time of day reasons.

According to a first embodiment, the distance between the defrosting surfaces may be smaller than a melting distance that is determined by the largest possible ice layer thickness of the liquid frozen between defrosting surfaces with a lower minimum temperature, the ice layer being completely meltable within the cold start period by the predetermined limited, maximal heating capacity of the heating element provided. Since the distance from a heat-irradiating defrosting surface to the next further defrosting surface does not exceed the melting distance, it is ensured that the frozen or solidified liquid lying between these defrosting surfaces is fully melted within a predetermined time after the cold start, the cold start period. If the distance between the melting surfaces is too large, the limited heating capacity of the heating element is not sufficient to fully fluidize the ice within the entire melting space, and the liquid consumer is not provided with the liquid quantity required for initiation.

On the other hand, the distance between the defrosting surfaces should also not be too small, to save material and to avoid an unnecessary heating of the liquid to be melted. This may be achieved in that the distance ratio from the distance between the defrosting surface divided by the melting distance is larger than 0.8, preferably larger than 0.9.

It also emerged that it is advantageous to design the defrosting surfaces with a possibly large heat-transmitting surface and to arrange them uniformly in the melting liquid volume. According to a further embodiment, the heat-transmitting surface of the defrosting surfaces in square centimeters may correspond at least to the melt liquid volume in cubic centimeters. It is particularly advantageous if the heat-transmitting surface of the defrosting surfaces in square centimeters corresponds at least 1.3 times, preferably 2 times the melting liquid volume in cubic centimeters.

To avoid evaporation or decomposition of the liquid, the capacity of the heating element is limited. A further limiting factor of the maximum heating capacity may further be the energy source of the motor vehicle, e.g. a car battery. According to a further embodiment, the predetermined limited, maximum power of the cold start heater may be smaller than a minimum melting capacity multiplied with a power output factor of 1.4, said minimum melting capacity being determined by the smallest possible heat quantity sufficient for melting down the cold start volume of frozen liquid of the lower minimum temperature and referring to the cold start period. A limited, maximum power may particularly be advantageous, which is smaller than 1.2 preferably 1.15 times the minimum melting capacity.

In an embodiment, the heating element of the cold start heater may be designed as a tubular radiator or as a cooling water cycle. Tubular radiators are available as standard heating elements in a cost-effective manner in various designs. By the selection of the material and the heating means it can be avoided that a maximum heating temperature, at which components of thermo-labile liquids, such as aqueous urea solutions decompose, is exceeded on the surface of the heating element. Furthermore, an advantage of the embodiment of the heating element as heating tube or flow cooling device is that this heating means can be coupled in an energy efficient manner with further heating cycles of motor vehicles. In this manner, heat generated in an internal combustion engine, which must for instance be discharged in the exhaust gas or along with the cooling water, can be used to provide the heating capacity of the melting device of the cold start heater.

According to a further embodiment, the heating element may be designed as electrical heating element. While in tubular radiators the heat irradiation surface is only heated indirectly by the heating fluid flowing through the tube, the exothermic defrosting surfaces of electrical radiators are directly heated. Thus, an electric heating device is advantageous with respect to the efficiency.

To avoid a too strong heating of the melting surfaces of electrical radiators and to avoid the risk of thermal decomposition of the liquid or deposition of contaminations on the defrosting surfaces, which lower the flow of heat, the cold start device according to the invention may in a further embodiment comprise a PTC (positive temperature coefficient) heating element as electric heating element. PTC heating elements only heat up to a predetermined limit or category temperature at which the electrical resistance of the PTC element increases abruptly and prevents a heating beyond the limit temperature. In this manner, PTC elements are self-regulating so that a temperature control means can be renounced.

It is particularly advantageous to design the heating element as a heating cartridge, into which cartridge the PCT element is cast or pressed. In this manner, a robust heating element of a compact structure is obtained, which is self-regulating and which can be produced in a cost-effective and constructive simple manner. Caused by the fact that an electric heating element is accommodated within a cartridge case, materials can be used as heat conductors which normally are not allowed to contact the liquid to be melted, since the cartridge sleeve is at the same time a protective sleeve.

In a further embodiment, the electric heating element can be formed substantially as a heating rod or as a tubular radiator. Heating rod in the sense of the invention is a substantially straight radiator with a melting axis, the longitudinal axis of the heating rod or tube. However, the expression heating rod must not exclusively be restricted to straight radiators but may also comprise curved rods.

The design with a rod-shaped heating element is particularly advantageous for a further design in which the defrosting surfaces span a substantially cylindrical, polyhedronal, prismatic or pyramidal as well as ellipsoidal melting liquid volume. The spatial shapes all have a longitudinal axis, which corresponds to the central symmetry axis or axis of rotation of the body and which extends in the direction of the largest, i.e. the elongate extension of the melting liquid volume.

In a further embodiment the heating element may be arranged substantially centrically in the melting liquid volume whereby the volume to be melted is heated uniformly. The heating element may particularly extend in parallel, preferably coaxially with respect to the longitudinal axis of the melting liquid volume. In this manner, the elongate heating element uniformly outputs heat over the complete length of the melting space. The coaxial arrangement has the further advantage that the heating rod has an almost constant distance, which corresponds to the width of the melting liquid volume, to the shell or jacket of the melting liquid volume. Thus it is achieved that the complete melting liquid volume is heated uniformly.

The melting liquid volume may consequently be defined by substantially two spatial components, the length on the one hand and the width on the other hand. According to a further embodiment, the spatial extension of the melting liquid volume may have a length L along the longitudinal axis of the melting liquid volume on the one hand and a width B on the other hand, which corresponds to the distance from the longitudinal axis of the melting liquid volume to its jacket, wherein the coefficient of expansion L/B lies in the range of 1 to 8, preferably at 3 to 5.

The width of the melting liquid volume may for instance in the case of a maximum heating power of 100 W and 800 W be 10 mm to 35 mm, preferably 25 mm, and 35 mm to 60 mm, preferably 43 mm, respectively. In consideration of the quotients of expansion, one obtains lengths of the melting water volume of 50 mm to 160 mm, preferably 100 mm at 100 W maximum heating power, and of 80 mm to 260 mm, preferably 175 mm at 800 W maximum heating power.

If the coefficient of expansion exceeds the value 8, the melting water space is disproportionally long with respect to its width. Consequently, the limited heating power of the heating element must be supplied in a distributed manner to a relatively great length.

If, on the other hand, the quotient of expansion is too small, i.e. the melting water volume is relatively short and broad, there is a risk that a temperature gradient occurs in the melting water volume. A broad volume means that the defrosting surfaces of the heat distribution elements extend relatively far from the heating element into the tank. If only a passive heating of the defrosting surfaces through the heating element takes place, the portions of the heating surfaces in the proximity of the heating element heat up more than the sections that are further remote.

To avoid a temperature gradient in the heat distribution element, at least one heat distribution element may be designed as a heat-generating further heating element according to a further embodiment. In this case, the complete surface of a directly heated heat distribution element is heated uniformly.

According to a further embodiment, the defrosting surfaces of the at least one heat distribution element may be arranged substantially orthogonal with respect to the melting axis of the heating rod. In this arrangement, the defrosting surfaces span the largest possible melting liquid volume, since the defrosting surfaces extend at the largest possible distance starting from the heating element into the tank space to be melted.

In a further embodiment, defrosting surfaces of the at least one heat distribution element may be arranged in a manner offset with respect to each other along the melting axis of the heating element. For a uniform heating of the melting liquid volume it is advantageous if the defrosting surfaces are offset at equal distances. If the different defrosting surfaces are arranged in parallel with respect to each other, the distance that must not exceed the melting distance results from the distance of the individual surfaces with respect to each other. As an alternative, several heat distribution elements may be arranged in a manner offset with respect to each other along the melting axis of the heating element instead of one heat distribution element with several defrosting surfaces.

It is also possible to arrange the defrosting surfaces of one or several heat distribution elements in a manner offset with respect to each other along the heating rod, but to vary the angles of inclination formed between the individual defrosting surfaces of the heat distribution elements and the heating rod. Concerning production, embodiments can be advantageous that comprise a melting plate having a substantially circular or round, elliptical or polygonal circumference.

According to an embodiment, the at least one heat distribution element may be formed as a melting plate. The use of a melting plate offers the advantage that heat can be transferred over a relatively large defrosting surface directly into the frozen or solidified liquid. Since the defrosting plate may at the same time have a relatively low thickness, e.g. less than 2 mm, preferably less than 1 mm, it is possible to heat the complete melting plate very quickly.

To arrange the melting plate in a heat-conducting manner on the heating element, the melting plate according to a further embodiment may have a central attachment opening, through which the heating element extends. Thereby it is achieved that the heat-conductive connection between the heating plate and the heating element takes place over the entire circumference of the attachment opening. The central arrangement of the attachment opening leads to the fact that a uniform heating of the defrosting surfaces of the heating plate takes place. Although an embodiment with a central attachment opening is described at this point, however, the attachment opening may of course also be formed at any other position of the heating plate.

According to a further embodiment, the at least one heat distribution element may be formed as a defrosting band. The advantage of this variant is that one distribution element only is necessary, which may form several defrosting surfaces, e.g. in that the defrosting band is guided several times away from the heating element and back to the heating element.

To achieve a possibly large contact surface between the heating element and the defrosting band, the heating band may according to a further embodiment be wound helically around the heating element in a manner forming a heating worm or screw. In this case, it is advantageous to attach the defrosting band on the heat element with its flat side faces so that the band width of the defrosting band represents the exothermic heating surfaces.

The attachment of the heat distribution element, such as a melting plate, or a defrosting band, on the heating element may be achieved in a positive-fit or adhesively bonding manner. The heat distribution element may for instance be plugged onto the heating element or it may be welded with to heating element. The attachment may basically be implemented in any manner and it may amongst others be achieved by pressing, adhering or fastening by means of screws.

To provide a defrosting band wound around a heating rod with more stability, stabilizing profiles may be formed in the heating band. The stabilizing profiles may for instance be corrugated profiles punched-in in the form of longitudinal beads or transversely to the longitudinal direction of the band, said corrugated profiles alternately elevating or lowering from the upper and lower side of the heating band.

According to a further embodiment, liquefaction rods may also be used instead of melting plates or defrosting bands. The rods may be arranged in parallel next to one another in a manner that they substantially correspond to the shape of a heating plate or a defrosting band. Although the manufacture and installation of a cold start heating with heating rods is more elaborate compared to heating plates, however, the effective defrosting surface and the liquid amount, which can be accommodated in the melting liquid volume of the cold start heating, rises.

Independent of the shape and arrangement of the heat distribution elements, the heat distribution elements may particularly be made of materials that have a favorable heat conductivity and a low mass, as is for instance the case in aluminum or copper as well as the alloys thereof. Furthermore, it must be noted that the heat distribution element must of course be resistant to corrosion with respect to the liquid to be heated. This must particularly be taken into consideration in a cold start heating for a liquid urea tank, since a 32.5% urea solution is slightly alkaline and therefore corrosive for some materials. In such a case, the heat distribution elements may consist of stainless steel, e.g. of alloyed Cr—Bi or Cr—Ni—Mo steel according to EN 10088-1 to 3.

In order to achieve that the cold start heating is switched-on only in cases in which the liquid is frozen in the vehicle tank, an embodiment with an ice sensor can be used. According to this embodiment, the cold start heating may have a control unit, which is connected on the one hand to at least one ice sensor through which the state of aggregation of the liquid in the tank can be detected and by which a phase signal characterizing the state of aggregation can be output to the control unit, and on the other hand is connected to the heating element, wherein a heating signal, which transfers the heating element from a rest state into the heat-generating operating state, can be output from the control unit to the heating element depending on a phase signal.

In a further embodiment, the cold start heater may have a locking element. By means of the locking element an receiving opening of the tank, through which the melting liquid volume of the cold start heating can be inserted into the tank along an insertion and mounting direction, can be locked in a fluid-tight manner. This design including a locking means, which makes the receiving opening of the tank module lockable, has the advantage, particularly in a modular kit of the cold start heating system, that the cold start heating does not only melt the demanded frozen liquid amount but also locks the receiving opening in the tank.

The locking means may for instance be formed as a cover. The fluid-tight connection of the cover to the receiving opening may be implemented by means of known locking mechanisms, e.g. a screw closure, a bayonet fixing or a snap closure.

Finally, it can be advantageous if the locking element has a discharge opening to which a fluid line leading to the liquid consumer can be connected, or into which a discharge means can be inserted in a way extending through the discharge opening of the locking means into the melting liquid volume.

A kit for a tank system for providing a predetermined cold start volume of an operating liquid, particularly a urea solution for a SCR catalytic converter required by a liquid consumer after a cold start, comprises a main tank module with a filling opening through which the tank interior of the main tank module can be filled with operating liquid, as well as a melting module that can be connected to the main tank module, said melting module comprising a melt tank module, which encloses a melting space and an inlet opening, through which the melting space in the installed condition of the tank system can be filled with operating liquid from the interior of the main tank and which comprises a discharge opening, and a cold start heating module for melting operating liquid frozen in the melting space, said cold start heating module being designed in a manner connectable to the melt tank module, wherein the melting space is at least as large as the cold start volume and smaller than the interior of the tank.

To obtain a simple maintenance, the melt tank module can be designed in a manner repeatedly detachable from the main tank module in a fluid-tight manner. Maintenance can also be improved in that the melt tank module comprises an receiving opening and the cold start heating module can be inserted into the melt tank module through the receiving opening along an installation direction and the cold start heating module can be designed in a manner repeatedly attachable and detachable in the melt tank module. In a further embodiment, the kit for the tank system therefore comprises a locking means, which locking element is designed in a manner sealing the receiving opening of the melt tank module.

Advantageously, the melt tank module may defines a melt tank portion in which the melting liquid volume of the cold start heating module is arranged in installed condition and whose volume substantially corresponds to the melting liquid volume. Furthermore, the melt tank module may have a discharge opening in the melt tank portion, wherein a fluid line leading to the liquid consumer can be connected to the discharge opening or into which a discharge device can be inserted in a position extending through the discharge opening into the melting liquid volume.

The kit for a tank system may comprise a cold start module according to the embodiment of one of the above described cold start heater of the tank system. The cold start heater itself may be structured modularly.

A kit for a cold start heating system for melting the liquid in tanks of motor vehicles determined for a liquid consumer, such as a SCR catalytic converter or a windscreen or headlamp washing system may comprise a tank module having an receiving opening and a cold start heating module, which can be inserted through the receiving opening along an installation direction into the tank module, and which is arranged in a manner repeatedly attachable and detachable in the tank module.

In an embodiment of the kit for a cold start heating system, the tank module may define a melt tank portion in which the melting liquid volume of the cold start heating module is arranged in installed condition and whose volume substantially corresponds to the melting liquid volume. In this embodiment the melt tank portion of the tank module approximately resembles the cold start volume required by the liquid consumer. Thus, the complete melt tank portion of the tank module may be melted very quickly so that the liquid consumer has the required amount of melted liquid within the cold start period.

According to a further embodiment of the kit system, the tank module may have a discharge opening in the melt tank portion to which discharge opening a fluid line leading to the liquid consumer can be connected or into which a discharge opening can be inserted so that extending through the discharge opening into the melting liquid volume, as already explained in detail above.

The kit system may also be integrated into already existing fluid systems of motor vehicles if the tank module is formed as an additional tank module which is in fluid-conducting communication with a liquid tank. In order to achieve that also in this case different additional tank modules may be arbitrarily exchanged, the tank module may be designed in a manner repeatedly detachable from the liquid tank, e.g. by means of an attachment flange according to a further embodiment.

The cold start heater described and the tank system described may particularly be used for melting down the liquid in tanks of motor vehicles, said liquid being determined for a liquid consumer, such as an SCR catalytic converter or a windscreen and headlamp washing system. Advantageously, the cold start heater according to the invention may be used for melting an aqueous urea solution, preferably a 30% or 35% urea solution or a cleaning solution of windscreen and/or headlamp washing systems.

Exemplary embodiments are described with reference to the enclosed drawings. The different features may be combined or omitted independent of one another, as it was already explained above in the individual embodiments.

BRIEF DESCRIPTION OF SEVERAL VIEWS OF THE FIGURES

FIG. 1 shows a fluid system 1 of a motor vehicle. The fluid system 1 comprises a tank 2 of a motor vehicle, a fluid line 3, e.g., hose line or a tubular line, a pump 4 as well as a liquid consumer 5. The tank 2 of the motor vehicle comprises an opening 6 for filling the tank 2 with a liquid 8. The opening 6 of the tank 2 is covered by a tank cover 7. Furthermore, the tank 2 has a discharge opening 9 to which the liquid line 3 with the pump 4 can be connected. By means of the pump 4, liquid 8 may flow out of the tank 2 through the discharge opening 9 if the pump 4 conveys the liquid 2 through the tubular line 3 to a liquid consumer 5.

FIG. 1 shows the discharge opening 9 of the tank 2 of the motor vehicle only as an example in the bottom portion of the tank 2. Of course, the liquid discharge may be at any position along the tank 2. Discharge devices (not shown in FIG. 1) can project into the tank.

Figure 1:
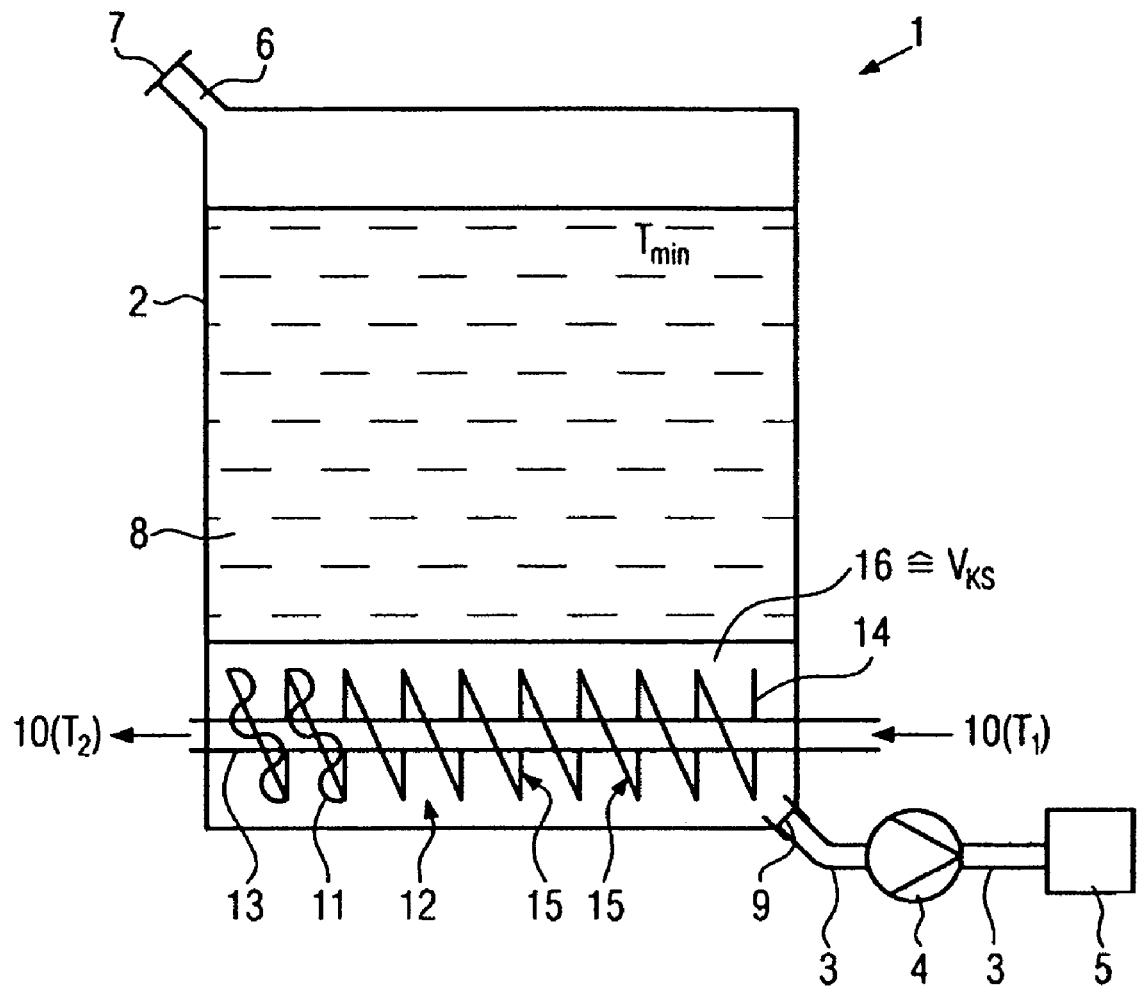
FIG. 1 shows a schematic view of a cold start heater in a fluid system comprising a vehicle tank system.

The fluid system 1 of FIG. 1 can be used to clean screens or headlamps as well as a catalytic converter system for reducing nitrogen oxides. In some embodiments, the liquid 8 accommodated in the tank 2 is a cleaning agent for screens or headlamps of motor vehicles, and the liquid consumer 5 is the windscreen or headlamp washing system 5 which requires the cleaning liquid 8 for operation. In some embodiments, the liquid 8 may be an aqueous, 32.5% urea solution, which is also known by the name AdBlue®, which is used by an SCR catalytic converter to convert nitrogen oxides in the exhaust gas of an internal combustion engine into chemically harmless exhaust gases. In this case, an SCR catalytic converter is the liquid consumer 5.

A problem of fluid systems 1 of motor vehicles shown in FIG. 1 is that the liquid 8 freezes, if the ambient temperature drops below the freezing point $T_S$ of the liquid. In this case, the fluid system 1 is no longer operative, since the solidified liquid 8 can no longer be transported to the liquid consumer 5.

In order to make the frozen liquid 8 in the tank 2 capable of flowing again, the cold start heater 12 can be used to heat the liquid 8.

The cold start heater 12 comprises a heating element 13 and a heat distribution element 14. The illustrated cold start heater 12 is arranged in the bottom portion of the interior 55 of the tank 2 of the motor vehicle.

The heating element 13 of FIG. 1 is formed as a tubular radiator. At an end of the tubular radiator 13, a heating liquid 10 at an input temperature $T_1$ flows into the radiator 13, through a section in the interior of the tank 2 of the motor vehicle, and finally exits at the other end of the heating element 13 with an output temperature $T_2$. While the heating liquid 10 flows through the tubular radiator 13, heat is directly transferred to the liquid 8 frozen in the tank 2, since the temperature of the heating liquid 10 is higher than the temperature $T_{MIN}$ of the frozen liquid 8.

A heat distribution element 14 is in heat-conductive communication with the heating element 13 and comprises defrosting surfaces 15 projecting into the tank 2 extending away from the heating element. If during operation of the cold start heater 12 the heating liquid 10 flows through the heating tube 13, a heat conduction from the radiator 13 to the defrosting surfaces 15 of the distribution element 14 takes place so that the heat can be directly transferred via the defrosting surfaces 15 into the frozen liquid 8.

Caused by the fact that the melting surfaces 15 project into the tank 2, they span a melting liquid volume 16 in the interior of the tank 2, which corresponds at least to the initial operating volume $V_{KS}$ of the liquid consumer 5.

In the embodiment of the cold start heater 12 of FIG. 1, the heat distribution element 14 is formed as a defrosting band. The defrosting band 14 is helically wound around the tubular radiator 13 such that the heating element 13 and the heat band 14 form a heat worm or screw which spans the melting liquid volume 16 in the interior of the tank 2.

To obtain a possibly large defrosting surface 15, the defrosting band 14 is arranged such that the flat side edges of the band 14 are attached at least section-wise on the surface of the radiator 13. Welding can couple the band 14 to the heating element 13.

To achieve a greater stability and an even larger defrosting surface 15 of the defrosting band 14, profiles 11 may be integrated into the band, which increase stability of the band body 14. Beads or corrugations can be punched in the longitudinal direction of the defrosting band 14. Alternatively, bulges indicated in FIG. 1 by reference numeral 11 can project transversely with respect to the longitudinal direction of the band 15 alternately toward the upper and lower sides.

The cold start heater 12, in some embodiments, can melt down a cold start volume $V_{KS}$ as quickly as possible. The initial operating volume $V_{KS}$ is a predetermined amount of liquid. For example, the predetermined amount of liquid can be 0.2 l or 1.0 l of an AdBlue® solution in passenger cars or commercial road vehicles, respectively, which must be available to the liquid consumer 5 in order to operate same.

Since the content of the melting liquid volume 16 of the cold start heater 12 corresponds at least to the operating start volume $V_{KS}$, the cold start heater 12 enables a dosed meltdown of an amount of fluid required for initiation of the liquid consumer 5.

Since it is desirable to melt down the frozen liquid 8 of a predetermined lower minimum temperature $T_{MIN}$ within a defined cold start period $t_{KS}$, which follows the cold start of the motor vehicle, defrosting surfaces 15 of the heating band 14 are arranged in the melting liquid volume 16 in a possibly uniform way.

It has proven that a quick, energy-efficient melting of the complete melting liquid volume 16 at a predetermined minimum temperature $T_{MIN}$ within a defined cold start period $t_{KS}$ can be achieved despite a limited heating power of the heating element 13, if the defrosting surfaces 15 have a distance D which does not exceed a melting distance $D_{MAX}$.

The geometric dimensions and expansion of the cold start heater will be described in detail in the following Figures.

Figure 2:
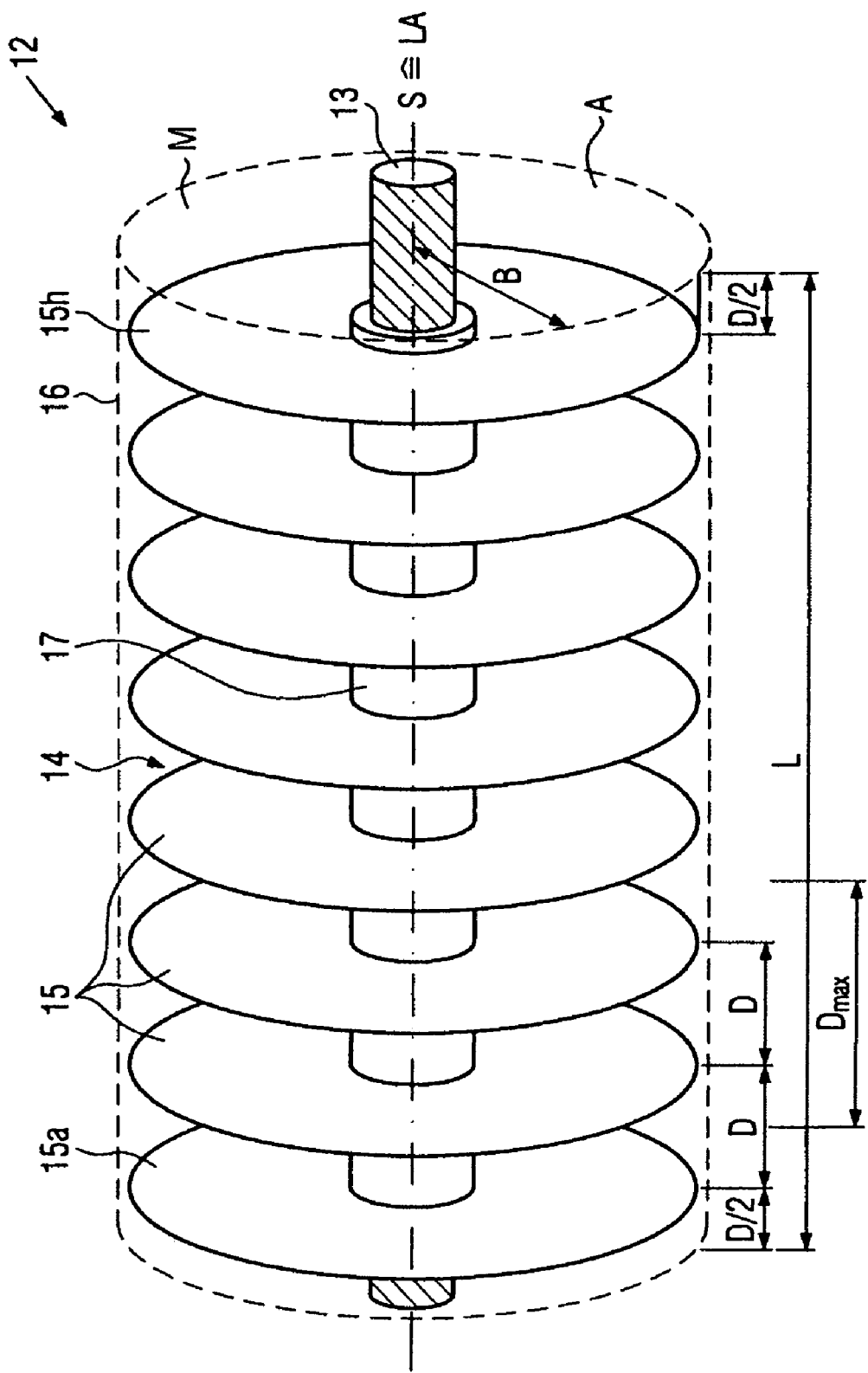
FIG. 2 shows a schematic view of a second embodiment of a cold start heater.

FIG. 2 shows a schematic view of a second embodiment of the cold start heater 12 according to some embodiments. For elements whose structure and/or function is identical or similar to elements of FIG. 1, the same reference numerals are used as in FIG. 1.

FIG. 2 shows an exemplary design with a cylindrical melting liquid volume 16. Advantageous designs and arrangements of the individual components of the cold start heater 12 are described with respect to each other.

The heating element 13 of FIG. 2 is substantially a heating rod 13, which, contrary to the tubular radiator of FIG. 1, is formed as an electric heating element. The electric heating element 13 is preferably a PTC thermistor (also designated as PTC element), since PTC elements are temperature-regulating, i.e. they only heat up to a maximum temperature.

The heat distribution element 14 of FIG. 2 used as a radiator is integral and comprises a melting sleeve 17 with plate-shaped defrosting surfaces 15.

The defrosting sleeve 17 is plugged onto the heating rod 13 such that the radiator 13 fills the interior of the sleeve 17 and protrudes from the ends of the sleeve 17. The sleeve 17 may be fixed in different manners on the heating element 13 in the direction towards the melting axis S of the heating rod 13. The melting sleeve 17 may for instance be pressed onto the radiator 13 in an adhesively binding manner. Alternatively, the sleeve 17 may be screwed in a positive-fit onto the heating rod 13. The sleeve 17 may also be adhered or held by external attachment elements such as attachment screws or rings, which are arranged on both sides of the sleeve 17.

As an alternative, the heat distribution element 14 may be structured modularly and may have a melting sleeve 17 on which individual defrosting surfaces 15 are plugged. It is advantageous that in a modular plug system the distance D between the defrosting surfaces 15, form, thickness, size, and/or the material of the defrosting plates 15 can be varied in any manner and can particularly simply be adapted to the demands of defrosting.

Independent of the attachment method, it is advantageous to achieve a possibly large contact surface between the outer surface of the heating rod 13 and the inner wall of the defrosting tube 17 of the heat distribution surface 14 so that a possibly efficient heat transfer from the heating element 13 to the sleeve 17 is achieved.

The defrosting surfaces 15 of FIG. 2 are formed as round melting plates. Of course, the shape of the melting plates 15 is not limited to a round circumference but may also be elliptical or polygonal. In FIG. 2 the heat distribution element 14 has eight defrosting surfaces 15, which are arranged substantially orthogonal with respect to the melting axis S of the heating rod 13. The individual heating surfaces 15 are offset from one another by a distance D along the melting axis S of the heating element 13.

Due to the rod-shaped design of the heating element 13 and the round defrosting surfaces 15, which are arranged perpendicular with respect to the heating rod, the defrosting surfaces 15 of FIG. 2 span a substantially cylindrical melting liquid volume 16, shown in FIG. 2 by the dotted line.

The spatial expansion of the melting liquid volume 16 is therefore determined by two parameters. The length L of the melting liquid volume 16 is substantially defined by the distance and the number n of the defrosting plates 15. The length L of the melting liquid volume 16 is effectively larger than the distance between the terminal defrosting plates 15a and 15h, since the melting surfaces pointing in the direction of the upper and lower front end side of the cylindrical melting liquid volume 16 also output heat.

The distance D of adjacent defrosting surfaces 15 in the melting liquid volume 16 may have a boundary distance D*) up to which the frozen liquid (not shown in FIG. 2) can also be melted down in the center between the defrosting surfaces 15. Thus, the melting liquid volume 16 projects at the terminal defrosting surfaces 15a and 15h in the direction of the front end sides of the melting water cylinder 16 at least about the length D/2.

The defrosting surfaces 15 of FIG. 2 are spaced at the pitch distance D along the heating rod. The length L of the melting liquid volume 16 corresponds to the number n of defrosting surfaces 15 (in this case eight) multiplied by the distance D between adjoining defrosting surfaces 15, i.e. L=n·D. The length L of FIG. 2 is 86 mm so that a distance D=12 mm results.

The second parameter, which characterizes the melting liquid volume 16, is the width B of the melting cylinder 16. The width substantially corresponds to the distance from the melting axis S of the heating element 13 or the longitudinal axis LA of the melting water cylinder 16 up to the sleeve or jacket M of the melting liquid volume 16. The width of the melting liquid volume 16 of FIG. 2 is approx. 25 mm, wherein the melting sleeve has a radius of approx. 9 mm.

The volume of the melting space 16 is calculated in the design of the cold start heater 12 of FIG. 2 according to the volume formula for cylinders, which is the cross-sectional surface A×cylinder length L, wherein the cross-sectional surface A of the cylinder is equal to the radius (in this case width B)$^2$×π.

The melting liquid volume 16 of the cold start heater 12 is, however, not restricted to the cylindrical design of FIG. 2. The defrosting surfaces 15 may span any spatial form, e.g. a substantially hexahedronal, prismatic, or pyramidal melting liquid volume (not shown). The spatial shape that the melting liquid volume 16 of the cold start heating 12 takes substantially depends on the spatial arrangement and the circumference of the melting surfaces 15. If square defrosting surfaces 15 are used, for example, a hexahedronal melting liquid volume 16 would be formed.

If, as an alternative, the defrosting surfaces 15, contrary to the embodiment of FIG. 2 in which all round defrosting surfaces have the same radius, would have radii successively becoming smaller along the melting axis S, a pyramidal volume would be formed. Besides the circumference of the defrosting surfaces 15, which usually determine the cross-section A of the melting liquid volume 16, other influential factors on the spatial design of the melting volume 16 also exist. These factors include, for example, the spatial course of the heating element 13, or the angle of inclination at which the defrosting surfaces 15 are arranged with respect to the heating rod 13, specifically its melting axis S. Instead of a straight heating rod 13, a curved or U-shaped heating rod may for instance also be used.

In order to achieve that the heat generated by the heating element 13 for melting the frozen liquid can be output in a possibly uniform manner in the melting liquid volume 16 by means of the heat conducting element 14, the heating rod 13 of FIG. 2 is arranged centrically in the melting liquid volume 16. The radiator 13 of the melting rod extends substantially parallel with respect to the longitudinal axis LA of the melting liquid volume 16. Strictly speaking, the heating rod 13 is arranged substantially coaxially with respect to the longitudinal axis LA of the melting liquid volume.

Because the melting axis S of the heating element 13 coincides with the longitudinal axis of the melting liquid volume 16, heat is uniformly output over the length L of the melting liquid volume 16. Uniform heat irradiation into the melting space 16 also takes place over the width B of the melting liquid volume 16.

Although the illustrated heat distribution elements 14 of FIGS. 1 and 2 are generally planar, the cold start heating 12 may not be restricted to planar heat distribution elements 14. Rather, elements having any shape (planar or non-planar), e.g. also heating rods (not shown) may be used, which transfer the heat generated by the heating element 13 in a distributed manner into the melting liquid volume 16.

Figure 3:
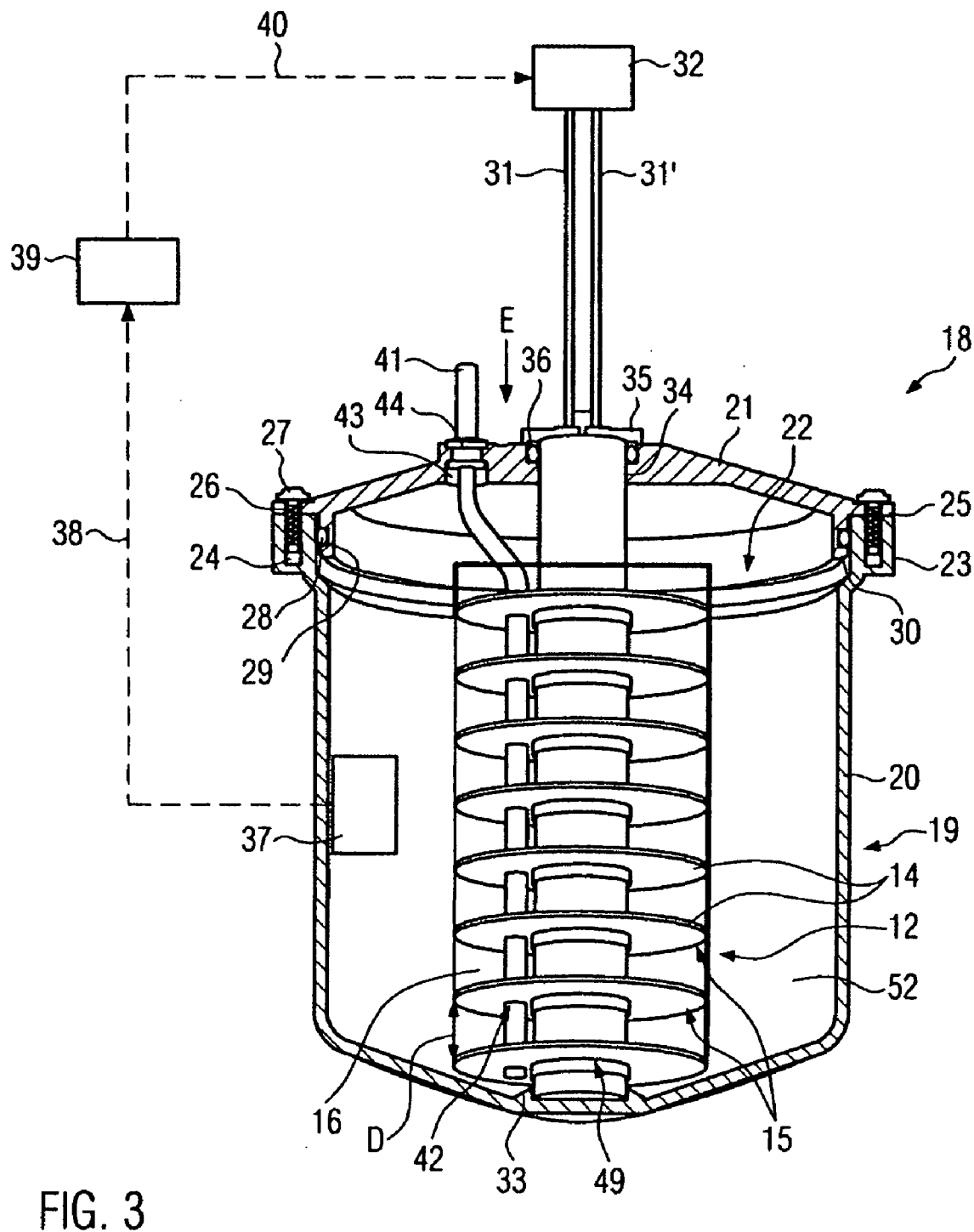
FIG. 3 shows a kit for a cold start system comprising a tank module and a cold start heater.

FIG. 3 shows a kit for a cold start heating system 18 for melting a frozen liquid. The system 18 comprises a cold start heater 12 according to another embodiment. For identical parts whose structure and/or function is similar or identical to parts of previous Figures, identical reference numerals are used. In the following, reference is only made to the differences of the modular cold start system 18 to the embodiments shown in FIGS. 1 and 2.

The modular cold start heating module 18 of FIG. 3 comprises a tank module or melt tank 19, and the cold start heating 12 in the tank module 19.

The tank module 19 of FIG. 3 defines a melt tank portion 52 (hereinafter also designated as melting space) and comprises a tank container 20 and a tank cover 21. The tank container 20 is substantially pot-shaped so that it comprises an receiving opening 22 at one side, wherein said opening can be sealed in a fluid-tight manner by the cover 21 as locking element. The ground of the pot-shaped tank container 20 is not fully planar but has a slight inclination extending towards the center of the ground so that it has a funnel shape.

The receiving opening 22 of the tank pot 20 is encircled by a circumferential edge 23, which is shaped such that the wall of the pot shell 57 is broadened towards the outside. The tank cover 21 has a coupling or support surface 25 on the edge of its lower side. The coupling surface 25 can rest on the edge 23 of the tank container 20 when the cover 21 closes the tank container 20.

Both the circumferential edge 23 of the container 20 and the coupling surface 25 of the locking cover 21 are provided with attachment portions 24 and 26, respectively, which coincide, if the cover 21 correctly locks the receiving opening 22 of the tank container 20. In FIG. 3, attachment portions 24 and 26 are formed as boreholes extending perpendicular with respect to a plane which spans the receiving opening.

If the attachment portions 24 and 26 are aligned, attachment means 27 (illustrated as screws in FIG. 3) may fixedly connect the tank container 20 and the tank cover 21 of the tank module 19. The attachment means 27 can include, without limitation, one or more rivets, clips, catches and counter-catches, screw covers. It applies for all these attachments that the tank cover 21 is detachable from the tank container 20. The cover 21 can be repeatedly coupled to and removed from the tank container 20.

A connection by means of welding of the tank container and the tank cover 21 is also possible, the repeated detachability is then dispensed with.

In some embodiments, the connection portion between the cover 21 and the container 20 must be fluid-tight. For this purpose the cover 21 is provided with a circumferential collar 30, which projects out of the lower side of the cover 21. The collar 30 rests in the locked position on the inner side of the pot shell in the area of the receiving opening 22. A groove 29 is formed in the outwardly facing wall of the circumferential collar 30 of the cover 21. A first sealing means 28 (e.g., an O-ring) is inserted into the groove 29.

A further component of the modular cold start heating system 18 is a cold start heater 12. The design of the cold start heater 12 of FIG. 3 is substantially similar to the cold start heater 12 of FIG. 2. Contrary to FIG. 2, the heating element 13 of FIG. 3 is a rod-shaped heating cartridge 13. A PTC element (not visible) is accommodated in the heating cartridge, e.g. by means of casting or pressing, to which two electrode bodies (not visible in FIG. 3) are associated. Each of the electrode bodies can be connected to a connection element 31 and 31', which in turn are connected to an electric energy source 32.

A further difference of the cold start heater 12 of FIG. 3 to the heater 12 of FIG. 2 is that several heat distribution elements 14, precisely eight heat distribution elements 14 are arranged along the longitudinal axis of the heating cartridge 13 in a manner offset with respect to each other. The defrosting surfaces 15 of the individual heat distribution elements 14 comprise a central passage or attachment opening 49 through which the heating cartridge 13 extends and at which the connection to the heating cartridge 13 takes place.

The defrosting surfaces 15 of the individual heat distribution elements 14 are arranged at a spacing D to each other in a manner forming a melting water space 16.

If the receiving opening 22 of the tank container 20 is not closed by the tank cover 21, the cold start heating module 12 can be inserted in an installation direction E into the melt tank portion 52 of the tank module 19. Subsequently, the tank cover 21 is fastened on the tank container 20, which at the same time effects a fixing of the cold start heating module 13 in the melt tank portion 52 of the tank module 19.

One end of the heating element cold start heater 12 centrically abuts on the bottom of the container 20. The illustrated end extends along the longitudinal axis of the cold start heater 12. A fixing perpendicular with respect to the longitudinal direction of the heating element 13 is implemented on the tank bottom by a circumferential bead 33 which laterally encloses the heating element 13.

In the area of the tank cover 21 the fixing takes place perpendicularly with respect to the longitudinal axis of the heating element in that the tank cover 21 has a central opening 34 which encloses the other end of the heating rod 13.

The length of the heating cartridge 13 is dimensioned such that if the one end rests on the bottom of the tank container 12, the other end of the heating cartridge is flush with the outer side of the cover 21 attached on the container 20.

The fixing element 35 fixes cold start heater 12 in the direction E. The fixing element 35 fixedly couples the attachment opening 34 to the tank cover 21. The fixing element 35 comprises two openings (not shown) through which the connection portions 31 and 31' pass and project from the locked tank module 19. The seam portion between the attachment opening 34 of the cover 21 and the fixing element 35 is locked in a fluid-tight manner by a second sealing element 36 (e.g., an O-ring).

An ice sensor 37 is in the melt tank portion 52 of the tank container 20. The ice sensor 37 can detect whether the liquid in the interior of the tank module 19 is frozen. If the sensor 37 detects frozen liquid, it outputs a phase signal 38, which describes the state of aggregation of the liquid, to a control unit 39. The control unit 39 is connected to the electrical energy source 32 of the cold start heating module 12. Depending on the phase signal 38, the control unit 39 can transmit a heating signal 40 to the energy source 32. The heating signal 40 is responsible for the fact that the heating cartridge 13 is supplied with power, whereby the solidified liquid in the melting liquid volume 16 is melted.

An ignition signal, a generator stage (such as an undervoltage) and/or the revolution or speed can be influential parameters, used to control the heating.

Finally, the modular cold start heating system 18 of FIG. 3 comprises a discharge device 41 that can convey the melted liquid from the closed tank module 19 to a liquid consumer (not shown in FIG. 3). The discharge device 41 of FIG. 3 is a substantially straight discharge tube 41, which is arranged in an axis-parallel manner with respect to the longitudinal axis of the heating module 13. The discharge tube 41 opens out in the area of the funnel bottom of the tank container 20 within the melting liquid volume 16. Starting from the mouth or port, the discharge tube 41 extends through passageway-openings 42 in the defrosting surfaces 15 of the individual heat distribution element 14 in an axis-parallel manner with respect to the heating cartridge 13 in the direction of the tank cover 21.

Because the passageway openings 42 in the defrosting surfaces 15 enclose the discharge tube 41, the discharge tube 41 can be heated while the heating cartridge 13 generates heat and heats the defrosting surfaces 15.

The discharge device 41 extends from the interior of the tank module 19 towards the outside through a discharge opening 43 in the cover 21 of the tank module 19. A sealing element 44 is in the discharge opening 43 of the cover 21. The sealing element 44 seals the opening 43 and fixedly retains the discharge tube 41.

One advantage of a modular cold start heating system 18 according to FIG. 3 is that different designs of the tank module and the cold start heating modules 12 can be used with each another. The heating modules 12 may be adapted for different demands for melting different types of liquids for a liquid consumer. The melt tank portion 52 of the tank module 19 may, for instance, hold about 0.6 liters. The cold start melting module 12 may have a melting water module that holds about 0.2 liters. The frozen liquid may melt during a cold start period $t_{KS}$ of 900 seconds. The frozen liquid may be at a minimum temperature $T_{min}$, which is up to 30° K below the melting temperature Ts of the frozen liquid, e.g. water. A minimum power ($P_{min}$) of approx. 87 W can be used to heat the ice to be melted within the 900 seconds to the melting temperature. In this manner, the ice is transformed from the solid to the liquid state of aggregation. In some embodiments, a heating element with a maximum heating power Pma, of 120 W, preferably 100 W may be used, which has 1.4 or 1.15 times the value of the minimum power. The distance D is preferably 8 mm to 16 mm. In some embodiments, the distance D is about 12 mm.

The capacity volume of the tank module 19, the melting liquid volume 16 of the cold start heating 12, the maximum heating power, and the geometry of the cold start heating are of course adapted to the demands of the liquid consumer and can be varied in any manner.

Figure 4:
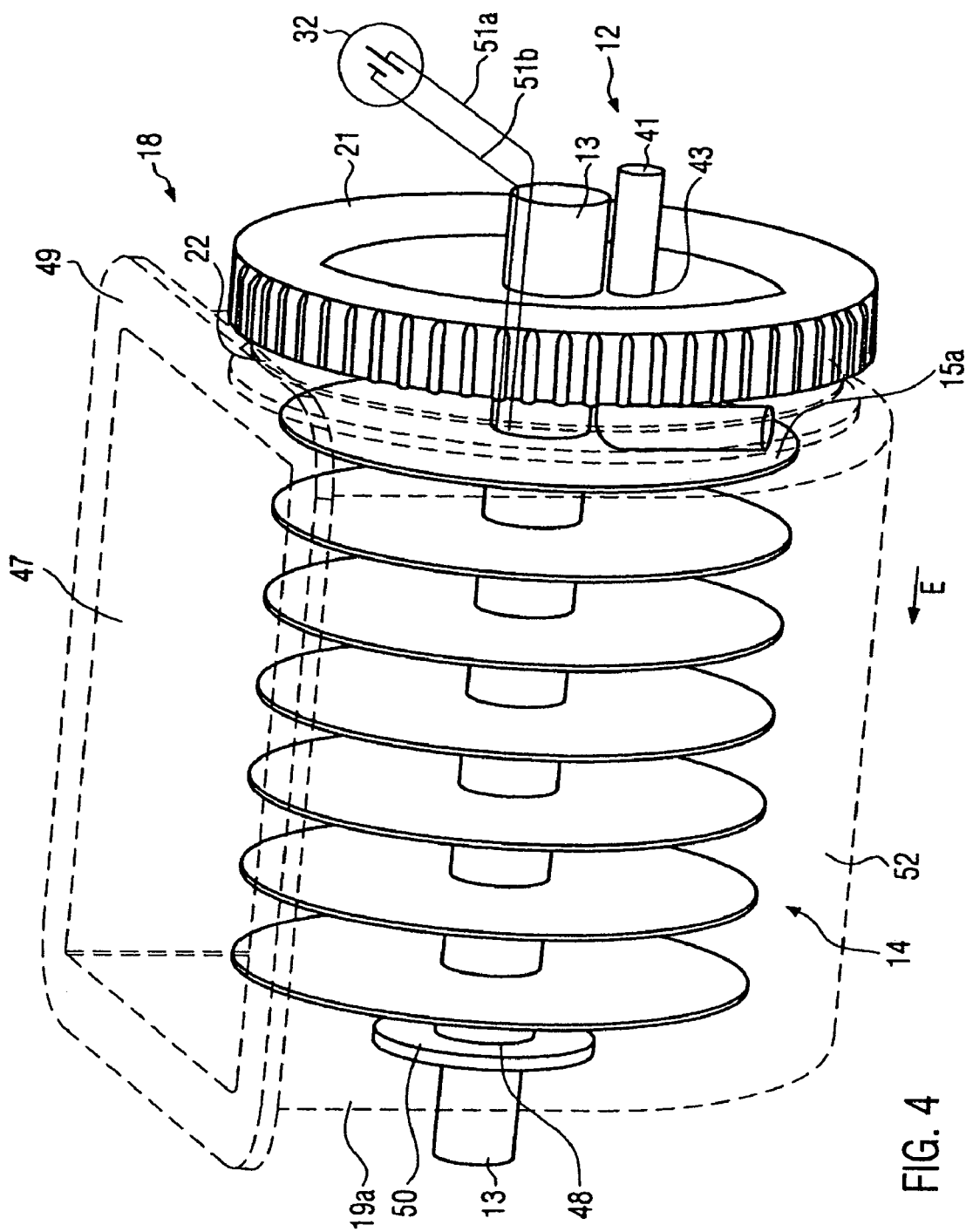
FIG. 4 shows a second tank module of the kit comprising a cold start heater.

FIG. 4 shows a schematic view of a modular cold start heating system 18 comprising an additional tank 19a as tank module and a cold start heater 12, in accordance with another embodiment. The same reference numerals are used for identical parts whose structure and/or function is identical to part of the preceding Figures. Reference will now only be made to the differences of FIG. 4 to the preceding embodiments.

The tank module of FIG. 4 is formed as an additional tank 19a and comprises an inlet opening 47 and an receiving opening 22.

The cold start heater 12 of FIG. 4 may be substantially similar to the heater 12 of FIG. 2. However, the heating element 13 of FIG. 4 is formed as a heating tube, which can be integrated into a cooling cycle (not shown). In this manner, different processes of a motor vehicle can be coupled with one another. The cooling water, can be used to heat the cold start heater 12. The cooling water can carry discharged waste heat of the combustion process, may for instance be used for heating the cold start heating 12 of the cold start heating system 18 according to the invention including the heatable additional tank 19a of FIG. 4.

The cold start heater 12 is inserted in the installation direction E through the receiving opening 22 of the tank module 19 into the melt tank portion 52 of the tank 19a. The installed cold start heater 12 is positioned generally centrically within the tank module 19a and almost completely fills the melt tank portion 52, since the melt tank portion 52 substantially corresponds to the melting liquid volume 16 (not shown in FIG. 4) of the cold start heater 12.

The receiving opening 22 can be locked by a locking means corresponding to the tank cover 21 of FIG. 3.

Opposing walls of the additional tank 19a form the attachment opening 48 and the receiving opening 22. The heating tube 13 of FIG. 4 extends through both the attachment opening 48 and the receiving opening 22. Of course, a respective sealing means (not shown) can lock the seam portion between the attachment opening 48 and the heating tube 13 in a fluidtight manner. Preferably, an attachment means 50 fixes the cold start heater 12 in the axial direction.

The cover 12 may be connected in different manners to the tank module 19a. Screws, a bayonet lock, a screw cap, clamps, clips, and/or other fastening means can couple the cover 12 to the tank module 19a.

Figure 5A:
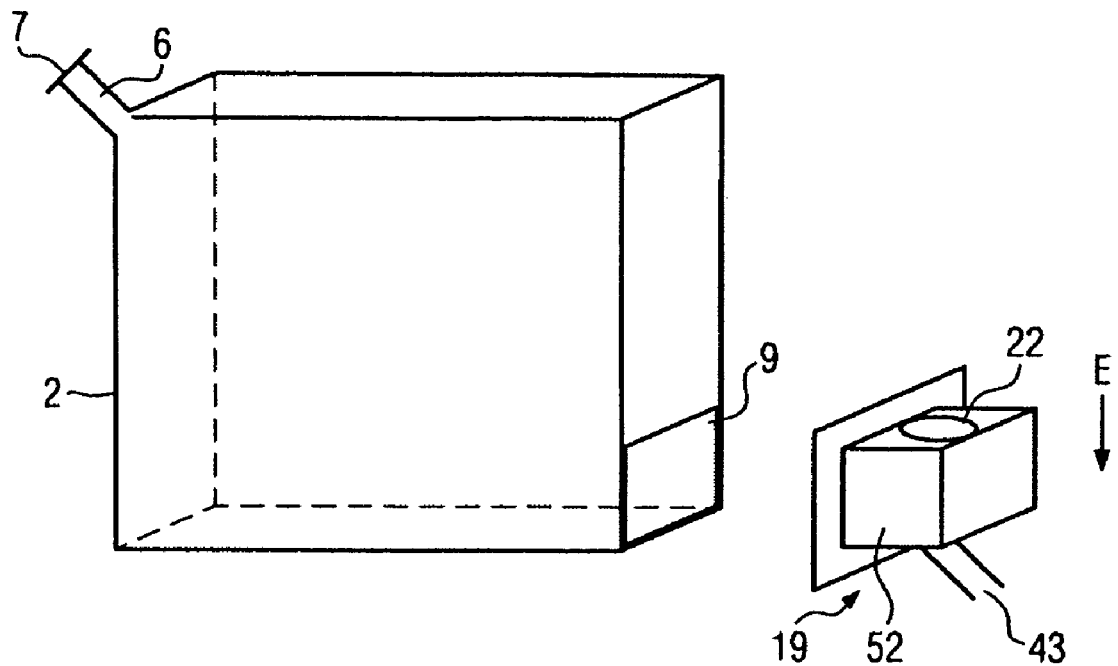
FIGS. 5a to 5c show a tank module of a kit according to a further embodiment.
Figure 5B:
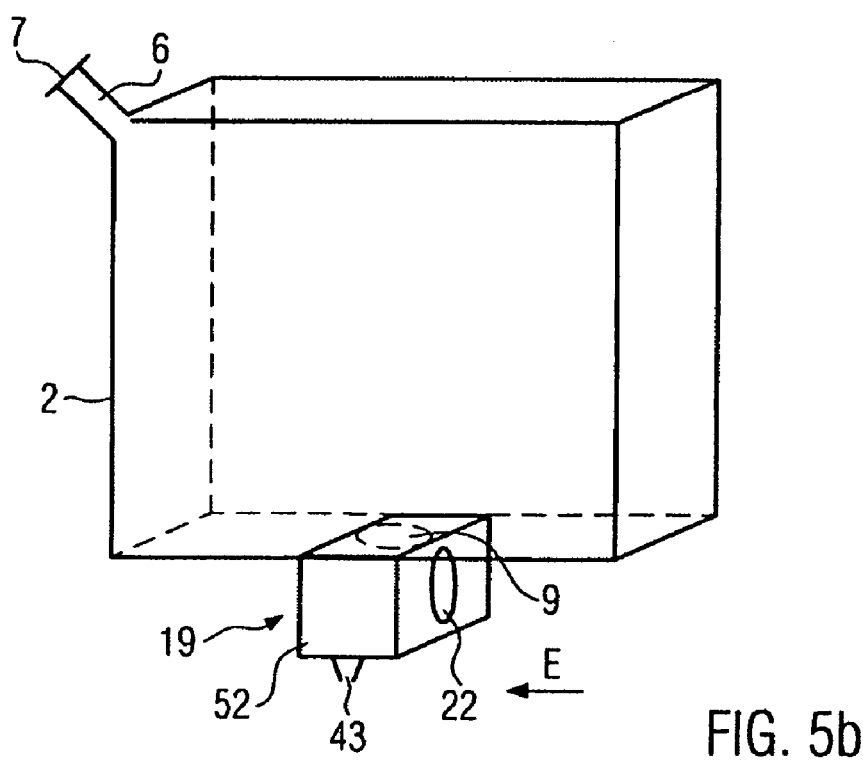
Figure 5C:
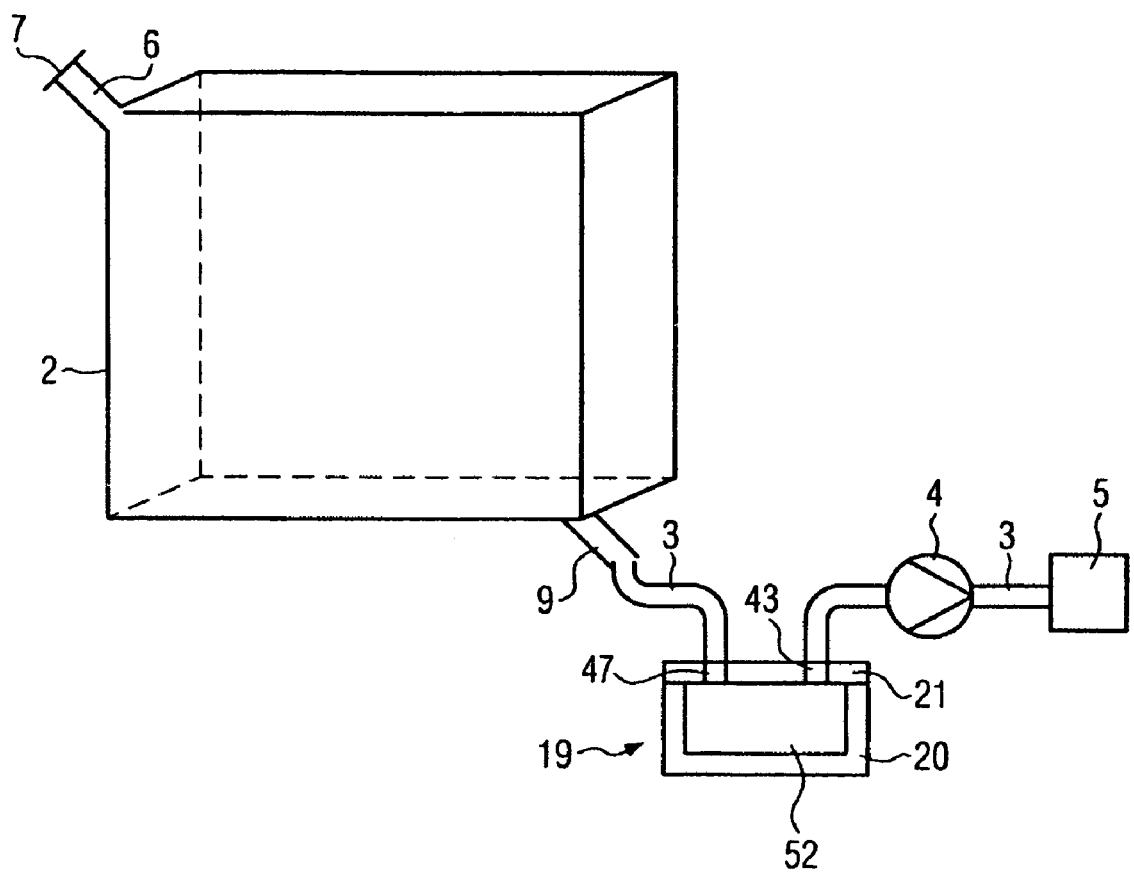

The inlet opening 47 of the additional tank module 19a extends along an entire side of the tank module 19a and is surrounded by an attachment shoulder 49. Via this attachment shoulder 49, the heated additional tank 19a may be connected to a respective opening of a liquid tank 2 in a repeatedly detachable, fluid-conductive manner. For example, the liquid tank 2 may have a discharge opening corresponding to the inlet opening 47 of the heated additional tank 19a. The attachment collar may, for instance, serve as an attachment flange. Of course, the tank module 19a may also be connected permanently, i.e., non-detachably, with a liquid tank in a motor vehicle. These two embodiments of the kit system 19 are illustrated in FIGS. 5a and 5b. In FIGS. 5a to 5c, the same reference numerals are used for the parts whose structure and/or function is similar to the parts of the preceding Figures.

In this manner a tank system is achieved in which the volume of the liquid tank 2 is increased by the melt tank volume 52 of the additional tank module 19a, which preferably corresponds to the cold start volume $V_{KS}$ of the consumer. Shortly after the cold start, the tank module 19a can provide a sufficient amount of liquid for the liquid consumer in FIG. 4. This liquid can be held in the melt tank portion 52.

The cover 21 of FIG. 4 also comprises a discharge opening 43, through which a discharge device 41 extends from outside the additional tank module 19a into its melt tank portion 52. The discharge device 41 of FIG. 4 is, contrary to the device of FIG. 3, not passed through the defrosting surfaces 16 but bends at an angle of 90° shortly before the first defrosting surface 15a and extends to the bottom of the additional tank 19a.

A further particularity of the cold start heater 12 of FIG. 4 is that the first heat distribution element 14a viewed from the locking element 21 is designed as a heat-generating further heating element. A pair of supply lines 51a, 51b is connected to an electric energy source 32. The electric supply lines 51a, 51b extend along the surface of the heating element 13 through the locking element 21 to the heat distribution element 14a. If a voltage is applied by the energy source 32, a current flows through the electrical supply lines 51a, 51b. The heat distribution elements 14a are connected in series between the supply lines 51a, 51b such that the current also flows through the distribution elements 14a. In this manner, the current heats the heat distribution elements 14a. The heat distribution elements 14a can be made of a resistance material.

Figure 6:
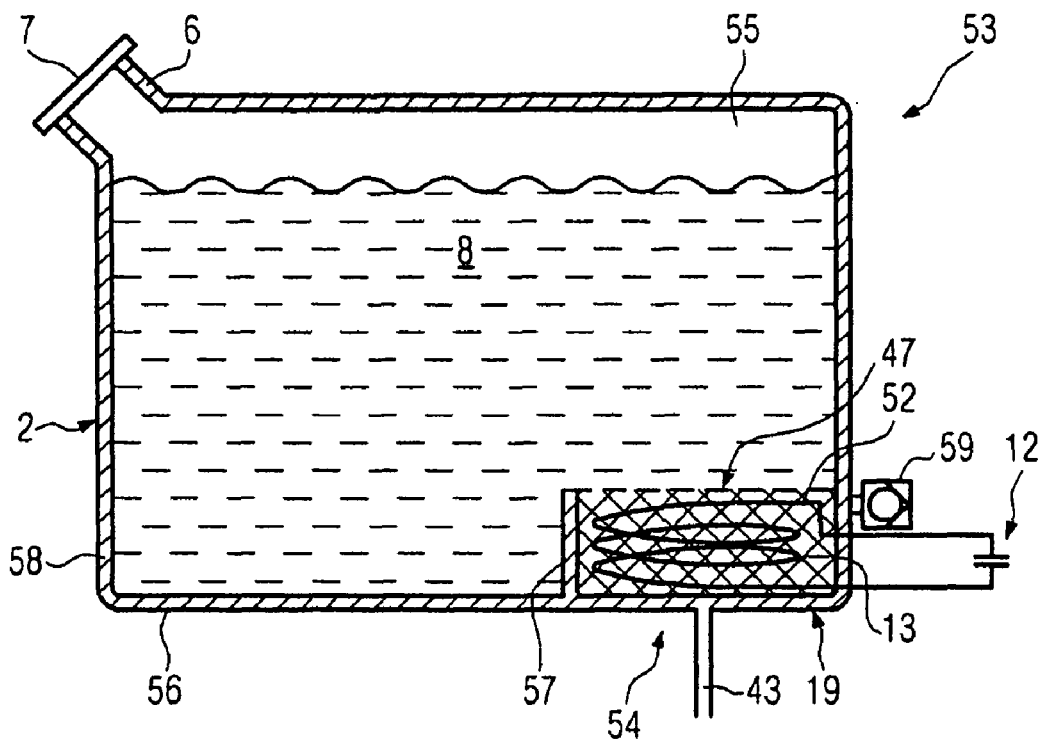
FIG. 6 show a schematic view of a tank system of a melt tank arranged in the main tank.

FIG. 6 schematically shows a tank system 53 for providing an ice-free cold start volume $V_{KS}$ of an operating liquid 8 to the liquid consumer 5 after a cold start. The tank system 53 may particularly be used for supplying a urea solution which is available for a SCR catalytic converter as a liquid consumer 5. Identical reference numerals are used for parts whose structure and/or function is identical to preceding Figures.

The tank system 53 comprises a main tank 2, which is substantially similar to the vehicle tank 2 shown in FIG. 1. The tank system 53 comprises a melting device 54 having a melt tank 19 and a cold start heater 12.

Contrary to the melt tank modules 19 of FIGS. 4 and 5a to 5c, which are separate components of a modular tank system, the melt tank 19 and the main tank 2 in FIG. 6 form an integral tank system 53.

The melt tank 19 of the melting device 54 is arranged in the interior 55 of the main tank 2 and encloses the melting space 52, which is in this manner spatially separated by the melt tank 19 from the tank interior of the main tank.

The melt tank 19 is substantially formed as a tank container open on one side. The tank container 19 is positioned in the interior 55 of the tank at the bottom 56 of the main tank 2. The melt tank shell 57 laterally encloses the melting space 52 and substantially extends perpendicularly from the tank bottom 56 into the interior 55 of the tank.

In the embodiment shown in FIG. 6, the melt tank 19 adjoins the tank shell 58 of the main tank 2 and merges section-wise into the tank shell 58. The melting space 52 in the embodiment shown in FIG. 6 is therefore enclosed on the bottom by a section of the tank bottom 56 and on the sides partially by the melt tank jacket 57 projecting into the interior 55 of the tank and section-wise by the tank shell 58 of the main tank 2.

The side of the melt tank 19 facing away from the tank bottom is open and forms the inlet opening 47 through which the melting space 52 is filled from the interior 55 of the main tank.

The melt tank 19 thus represents a portion of the tank system 52 spatially separated from the remaining interior 55 of the main tank 2, in which an ice-free cold start volume $V_{KS}$ of the operating liquid can be provided for a liquid consumer 8 (e.g., a liquid consuming device) within a short cold start period $t_{KS}$.

For this purpose, the melt tank 19 comprises a discharge opening 43, which communicates with the surroundings of the tank system. Similar to the discharge opening of FIG. 1, a liquid line 3 with a pump can be connected to the discharge opening 43.

The cold start heater 12 is arranged in the melting space 52 and comprises an electrical heating element 13, which can melt ice during a short cold start period $t_{KS}$.

Moreover, the melt tank 19 comprises a ventilation valve 59 in its shell section formed by the jacket 58 of the main tank. The ventilation valve 59, e.g. a return valve, substantially prevents that a vacuum pressure build up in the melt tank 40 when melted down liquid is removed from the melting space 52 via the discharge opening 43 without the sucked-off liquid being replaced by liquid from the interior 55 of the tank through the inlet opening 47. This may be the case shortly after the cold start when the operating liquid 8 is melted in the melting space 52 but the operating liquid 8 in the interior 55 of the main tank 2 is still frozen.

Figure 7:
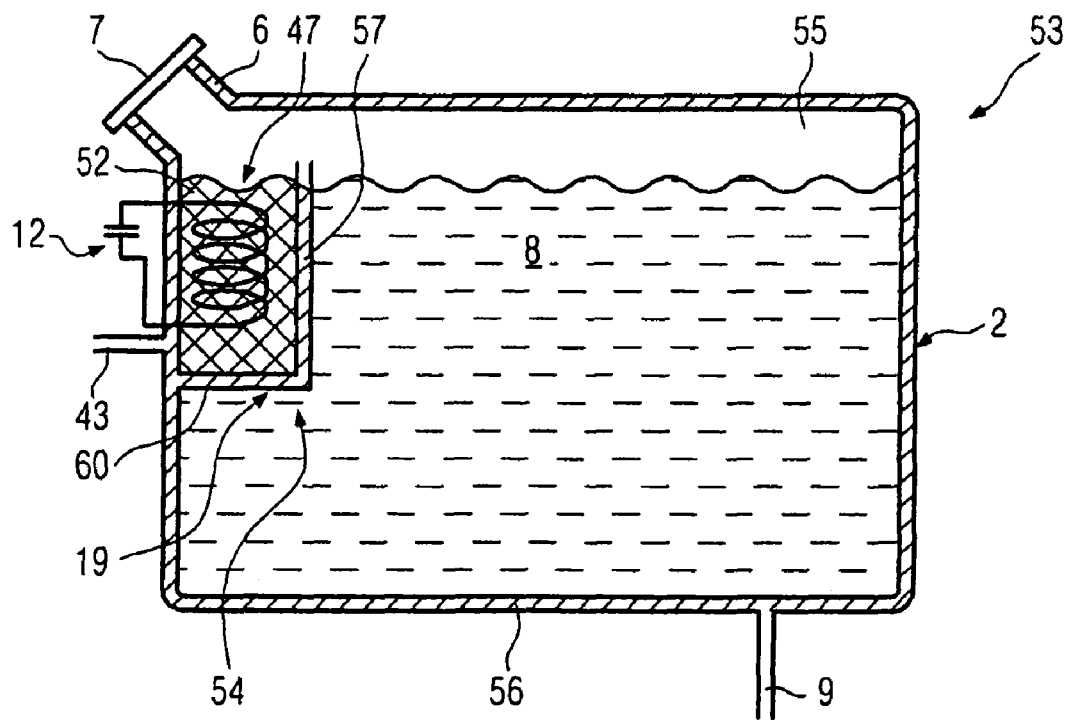
FIG. 7 shows a schematic view of a further tank system of a melt tank arranged in the main tank.

FIG. 7 shows a schematic sectional view of the tank system 53 in a further embodiment. The embodiment is substantially similar to the embodiment of FIG. 6 so that reference will now only be made to the differences and identical reference numerals are used for identical parts whose structure and/or function is identical to parts of preceding Figures.

In FIG. 7 the melt tank 19 of the melting device 54 in the interior 55 of the main tank 2 is spaced apart from the bottom 56 and is arranged in a manner exclusively adjoining the tank jacket 58. The melt tank bottom 60 extends substantially perpendicularly from the tank jacket 58 of the main tank 2 into the interior 55 of the tank. The melting space 52 of the melt tank 19 is enclosed laterally by a melt tank shell 57 in a manner similar to the melting space of FIG. 6.

The discharge opening 43 of the melt tank 19 is, contrary to the embodiment of FIG. 6, formed in the melt tank jacket 57 above the melt tank bottom 60.

The inlet opening 47 can be close to the upper side of the main tank 2 and below the filling opening 6 of the main tank 2. The illustrated inlet opening 47 is generally perpendicular to the direction of gravity. Since the inlet opening 47 according to this embodiment is usually above the operating liquid level in the main tank 2, an additional ventilation valve for the melt tank 19 is not required.

The arrangement of the inlet opening 47 of the melt tank 19 below the filling opening 6 in the direction of gravity has the advantage that operating liquid 8, which is filled into the main tank 2, is filled via the interior 55 of the main tank directly through the inlet opening 47 into the melting space 52 of the melt tank 19.

Furthermore, the tank system 53 of FIG. 7 comprises a discharge opening 9 in the bottom 56 of the main tank 2. The opening 9 of FIG. 7 can be generally similar to the embodiment shown in FIG. 1.

Figure 8:
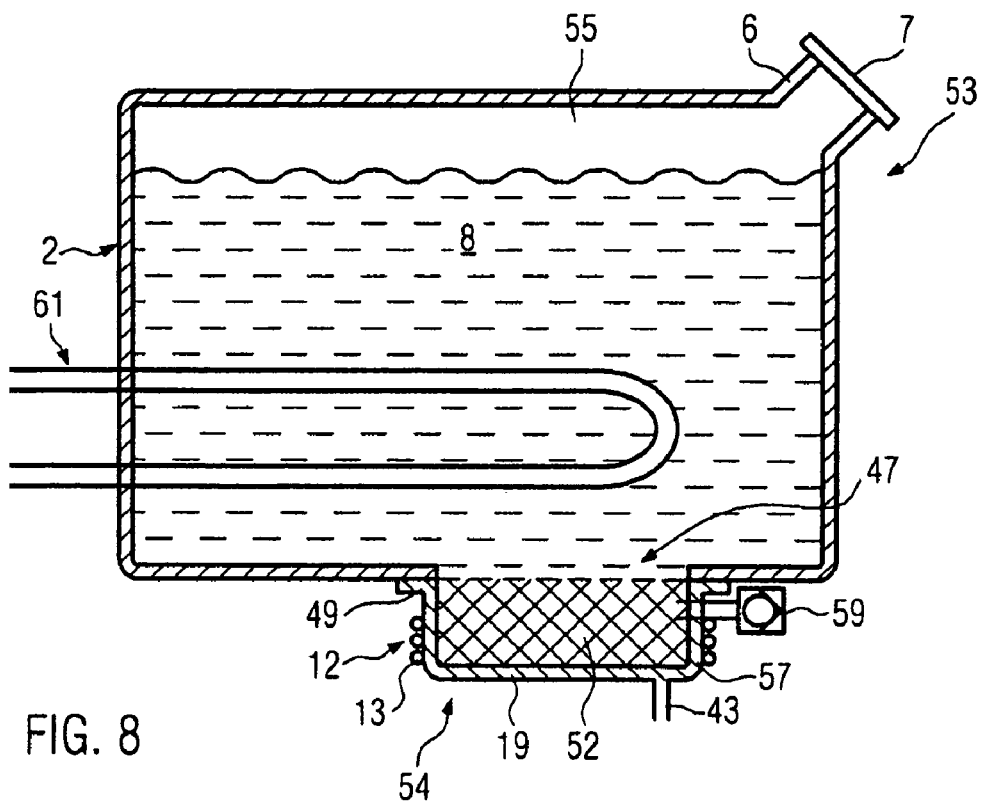
FIG. 8 shows a schematic view of a further tank system.

FIG. 8 shows a schematic sectional view of the tank system 53 in a further embodiment, which is a modification of the embodiments shown in FIGS. 4, 5a, and 5b.

FIG. 8 shows a modular tank system 53 comprising a main tank 2 and a melt tank 19 as separate components. The main tank 2 comprises an opening on the tank bottom 56, which, in the condition where the melt tank 19 is mounted on the main tank 2, coincides with the inlet opening 47 of the melt tank 19. In FIG. 8 the melt tank 19 is arranged on the outside of the main tank 2.

The melt tank 19 of FIG. 8 is generally bowl-shaped (e.g., it is formed open on one side). Contrary to the melt tank 19 of FIG. 4, the melt tank 19 of FIG. 7 does not comprise an receiving opening 22. The melt tank 19 includes a discharge opening 43 in the melt tank bottom 60. The inlet opening 47 is enclosed by an attachment shoulder 49 via which the melt tank 19 is attached to the main tank 2 with respective sealing means not shown in FIG. 8.

In this manner, the melt tank forms a melting space 52 spatially separated from the interior 55 of the main tank 2 and in the direction of gravity of the interior 55 of the tank.

The cold start heating 12 comprises a heating element 13 in the form of a tubular radiator which is arranged on the outside of the melt tank jacket 57 and which is wound around the shell several times.

Of course, a cold start heating, particularly in the modular design shown in FIG. 4, can be arranged alternatively or additionally in the melting space 52. Of course, electric heating elements can also be arranged on the out side of the melt tank 19. In principle, the melting of liquid frozen in the melting space 52 can be implemented by any type of heating device, which is arranged at least section-wise in or around the melting space.

Finally, the melt tank shown in FIG. 8 comprises a ventilation valve 59 similar to the design of FIG. 7.

In order to rapidly melt frozen liquid in the interior 55 of the tank so that the fluid can follow quickly from the main tank 2 through the inlet opening 47 into the melting space 52, the tank system 53 of FIG. 8 comprises an additional heating device 61 in the main tank for melting operating liquid 8 frozen in the interior 55 of the main tank.

In the embodiment shown, the further heating device 61 comprises a tubular radiator, which, forming a heating coil, is arranged in the interior 55 of the tank close to the bottom 56 and which is preferably operated by cooling liquid, which was heated by the diesel engine. Electrical heating systems are also possible in this case.

Figure 9:
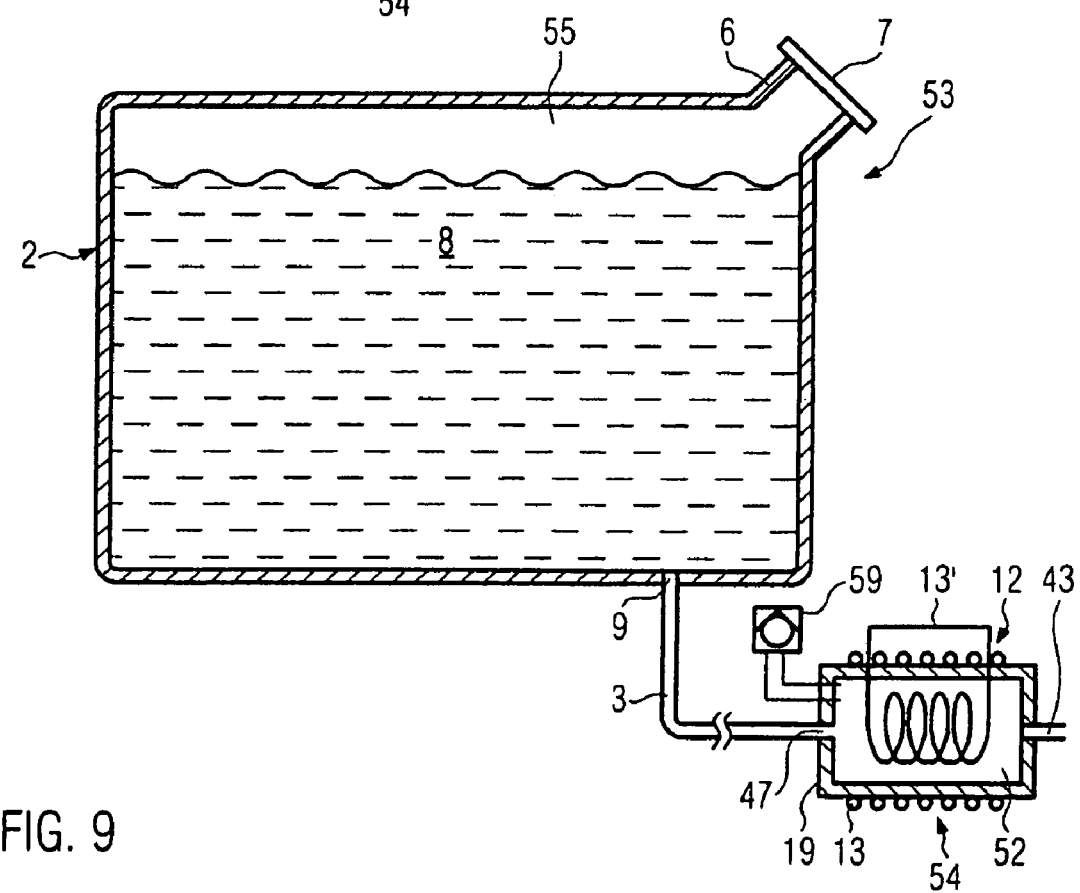
FIG. 9 shows a schematic view of a further tank system with a melt tank arranged spatially separated from the main tank.

FIG. 9 finally shows a further embodiment of the tank system according to some embodiments, which substantially corresponds to the embodiment of FIG. 5c. The melting device 54 is arranged in a manner spatially separated from the main tank 2. The main tank 2 may, for instance, be accommodated in the reservoir cavity of a motor vehicle and the melting device 54 may be accommodated in the engine space in the proximity of the pump or dosing unit or of the liquid consumer.

The interior 55 of the main tank is connected via a connection line 3 to the inlet opening 47 of the melt tank 19. The connection line 3 extends from a discharge opening 9 in the bottom of the main tank to the inlet opening 47 of the melt tank 57. In this manner, the melting space 52 may be filled with operating liquid 8 from the interior 55 of the main tank 2. A fluid-conducting connection in the outflow direction from the interior 55 of the tank through the discharge opening 9 of the main tank via the fluid line 3 through the inlet opening 47 into the melting space 52 is ensured.

The cold start heater 12 of the melting device 54 may be arranged within the melting space. Additionally or alternatively, the cold start heater 12 can be on the outside of the melt tank 19 and may comprise both an electric heating element, as well as any other heating element.

The above embodiments only represent exemplary designs, whose features can be combined or modified in any manner. Thus, it is possible, for example, to heat all defrosting surfaces 15 of the heat distribution elements 14 directly and actively to avoid a possible temperature gradient in the defrosting surfaces 15. Furthermore, the tank module 19 of the kit system 18 of FIG. 3 may also have an inlet opening 47, which can be connected with a discharge opening 9 of a liquid tank in a fluid-conducting manner, as indicated in FIG. 5c and FIG. 9.

Furthermore, the modular design of a main tank 2 and a melt tank module 19 is not only possible in the embodiments shown in FIGS. 5a to 5c, 8, and 9. A melt tank module 19 may also be arranged in the interior 55 of the tank and may be connected with the main tank 2 in a manner forming a fluid-tight tank system. A main tank 2 with a melt tank 19 arranged on the outside of the main tank 2 may also be formed as an integral tank system.

Finally, the use of the heating means according to the invention is not only limited to the cold start process. The heating means can function when the liquid freezes in the tank during operation, such as when the ambient temperature drops.

The invention claimed is:

1. A tank system for providing a selected cold start volume of an operating liquid required by a liquid consumer after a cold start, the tank system comprising a main tank containing an operating liquid comprising a urea solution, the main tank including a filling opening through which an interior of the main tank can be filled with operating liquid, a melting device comprising a melt tank and a discharge opening, the melt tank enclosing a melting space and comprising an inlet opening through which the melting space can be filled from the interior of the main tank with the operating liquid, and the melting device comprising a cold start heater for melting operating liquid frozen in the melting space, wherein the melting space is at least as large as the cold start volume and is smaller than the interior of the main tank.

2. The tank system of claim 1, wherein the cold start heater comprises at least one heating element and at least one heat distribution element, the at least one heating element having a predetermined limited, maximum heating power and configured to generate heat, the at least one heat distribution element conductively coupled to the at least one heating element, the at least one heat distribution element comprises defrosting surfaces projecting into the melt tank and extending away from the heating element such that heat is transferred from the defrosting surfaces into the liquid frozen in the melt tank, the defrosting surfaces span a melting liquid volume equal to or greater than the cold start volume, wherein the cold start volume is sufficient for the liquid consumer to operate within a defined cold start period.

3. The tank system of claim 1, wherein the melting device is disposed in the interior of the main tank.

4. The tank system of claim 1, wherein the melting device is disposed on the outside of the main tank.

5. The tank system of claim 1, wherein the melt tank is disposed on a bottom of the main tank.

6. The tank system of claim 1, wherein the melt tank is arranged on a tank jacket of the main tank.

7. The tank system of claim 1, wherein the melting device is spatially separated from the main tank, wherein the interior of the main tank is in fluid communication with the inlet opening of the melt tank via a connection line.

8. The tank system of claim 1, wherein the melt tank is formed open on one side.

9. The tank system of claim 1, wherein the melt tank has a ventilation valve.

10. The tank system of claim 1, wherein the main tank comprises a discharge opening.

11. The tank system of claim 1, wherein the melt tank and the main tank are integrally formed together.

12. The tank system of claim 1, wherein the melt tank and the main tank are separate components.

13. The tank system of claim 1, wherein the cold start heater is positioned in the melting space.

14. The tank system of claim 1, wherein the cold start heater is positioned on an outer wall of the melt tank.

15. The tank system of claim 1, further comprising a heating device for melting operating liquid frozen in the interior of the main tank.

16. The tank system of claim 1, wherein the melt tank is dimensioned such that the melting space has a volume that is at least as large as the cold start volume which is sufficient for an SCR catalytic converter to operate within defined cold start period.

17. A kit for a tank system for providing a predetermined cold start volume of an operating liquid to a liquid consuming device after a cold start, the kit comprising a main tank module with a filling opening through which an interior of the main tank module is filled with operating liquid comprising a urea solution, a melting module that is connectable to the main tank module, the melting module comprising a melt tank module enclosing a melting space and an inlet opening through which operating liquid from the interior flows to fill the melting space can be filled with operating liquid from at least one of the interior of the main tank module and a discharge opening, and a cold start heating module for melting operating liquid frozen in the melting space, the cold start module configured to be coupled to the melt tank module, the melting space is at least as large as a cold start volume and is smaller than the interior of the main tank module.

18. The kit according to claim 17, wherein the cold start module is the cold start heater comprises at least one heating element and at least one heat distribution element, the at least one heating element having a predetermined limited, maximum heating power and configured to generate heat, the at least one heat distribution element conductively coupled to the heating element, the heating distribution element comprises defrosting surfaces projecting into the tank and extending away from the heating element such that heat is transferred from the defrosting surfaces into liquid frozen in the tank, the defrosting surfaces span a melting liquid volume equal to or greater than the cold start volume, wherein the cold start volume is sufficient for the liquid consuming device to operate within a defined cold start period.

19. The kit for the tank system of claim 18, wherein the melt tank module includes a receiving opening, the cold start heating module is configured to pass through the receiving opening into the melt tank module.

20. The kit of claim 19, further comprising locking means for sealing the receiving opening of the melt tank module.

21. The kit of claim 17, wherein the melt tank module defines a melt tank portion, in which a melting liquid volume of the cold start heating module is positioned, a volume of the melt tank portion is equal to or greater than the melting liquid volume.

22. The kit of claim 21, wherein the melt tank module comprises a discharge opening in the melt tank portion configured to couple to a fluid line coupled to the liquid consuming device or into which a discharge device can be inserted such that the discharge device expands through the discharge opening and into the melting liquid volume.

23. The kit of claim 17, wherein the melt tank module is configured to be repeatedly detachable from the main tank module.

24. A kit for a cold start system for melting liquid in a tank of a motor vehicle, the liquid comprising a urea solution suitable for an SCR catalytic converter, the kit comprising a tank module having a receiving opening and a cold start heating module, at least a portion of the cold start heating module configured to be inserted into the tank module through the receiving opening and configured to be repeatedly coupled to and detached from the tank, wherein the cold start heating module is a cold start heater, the cold start heater comprises at least one heating element and at least one heat distribution element, the at least one heating element having a predetermined limited, maximum heating power and configured to generate heat, the at least one heat distribution element conductively coupled to the heating element, the heating distribution element comprises defrosting surfaces projecting into the tank and extending away from the heating element such that heat is transferred from the defrosting surfaces into liquid frozen in the tank, the defrosting surfaces span a melting liquid volume equal to or greater than a cold start volume, wherein the cold start volume of the melted liquid comprising the urea solution is sufficient for a liquid consuming device to operate within a defined cold start period.

25. The kit of claim 24, further comprising a locking means for sealing the receiving opening of the melting tank module.

26. The kit of claim 24, wherein the tank module defines a melting tank portion, the melting liquid volume of the cold start heating module is substantially equal to a volume of the melting tank portion.

27. The kit of claim 26, wherein the melting tank module comprises a discharge opening in the melting tank portion configured to couple to a fluid line or into which a discharge device can be inserted such that the discharge device extends through the discharge opening into the melting liquid volume.

28. The kit of claim 24, wherein the tank module is formed as an add-on module which is fluidly connected to the fluid tank.

29. The kit of claim 24, further comprising an additional tank module configured to be repeatedly coupled to and detached from the main tank module.

30. A method of using the tank system of claim 1, the method comprising melting a liquid held in the tank system, wherein the liquid is suitable for use with an SCR catalytic converter, windscreen, or headlamp cleaning system.

31. The method of claim 30, wherein the liquid comprises an aqueous urea solution.

32. The method of claim 31, wherein the aqueous urea solution comprises 30% to 35% of urea.

33. The method of claim 30, wherein the liquid is a cleaning solution for windscreen and/or headlamp cleaning systems.

34. The kit of claim 24, wherein the defrosting surfaces span the melting liquid volume that is equal to or greater than the cold start volume which is sufficient for an SCR catalytic converter to operate within the defined cold start period.

35. The kit of claim 17, wherein the melt tank module defines the melting space that is at least as large as the cold start volume which is sufficient for an SCR catalytic converter to operate within a cold start period.

* * * * *